US012578759B2

(12) United States Patent
Wong

(10) Patent No.: US 12,578,759 B2
(45) Date of Patent: Mar. 17, 2026

(54) CIRCULAR DONGLE WINDING MECHANISM WITH ENHANCED RETAINING FEATURES

(71) Applicant: Dell Products L.P., Round Rock, TX (US)

(72) Inventor: Hin Loong Justin Wong, Singapore (SG)

(73) Assignee: Dell Products L.P., Round Rock, TX (US)

( * ) Notice: Subject to any disclaimer, the term of this patent is extended or adjusted under 35 U.S.C. 154(b) by 186 days.

(21) Appl. No.: 18/223,827

(22) Filed: Jul. 19, 2023

(65) Prior Publication Data

US 2025/0028359 A1     Jan. 23, 2025

(51) Int. Cl.
G06F 1/16          (2006.01)

(52) U.S. Cl.
CPC .................................. G06F 1/1632 (2013.01)

(58) Field of Classification Search
CPC ......... H02G 11/02; G06F 3/0661; G06F 3/06; G06F 1/1632; H01R 43/20; H01R 13/42; H01R 13/665; H01R 13/502; H01R 31/06; H01R 27/02; H01R 13/72; H01R 13/62; H01R 31/065; H01R 13/6205; H01R 12/75; H04L 69/08; H04L 29/06; H04L 29/06068; B23P 19/04
USPC ...................................................... 361/679.41
See application file for complete search history.

(56) References Cited

U.S. PATENT DOCUMENTS

| | | | | |
|---|---|---|---|---|
| 5,829,987 | A * | 11/1998 | Fritsch | H01R 13/7037 |
| | | | | 200/51.09 |
| 7,374,142 | B2 * | 5/2008 | Carnevali | F16M 13/00 |
| | | | | 224/183 |
| 10,483,681 | B1 * | 11/2019 | Du | H02G 11/02 |
| 11,240,925 | B1 * | 2/2022 | Wong | H05K 5/0247 |
| 11,316,312 | B2 | 4/2022 | Justin | |

* cited by examiner

*Primary Examiner* — Imani N Hayman
*Assistant Examiner* — Ross Terry Mularski
(74) *Attorney, Agent, or Firm* — Zagorin Cave LLP; Robert W. Holland

(57) ABSTRACT

An information handling system mobile peripheral adapter interfaces with an information handling system through a cable connector that extends from a circular housing so that the information handling system can use peripherals coupled to ports of the circular housing. The cable and connector retract into a cavity of the circular housing so that at a fully retracted position a magnet in a bottom surface of the upper circular housing portion biases a magnet of the cable connector inward.

20 Claims, 17 Drawing Sheets

44
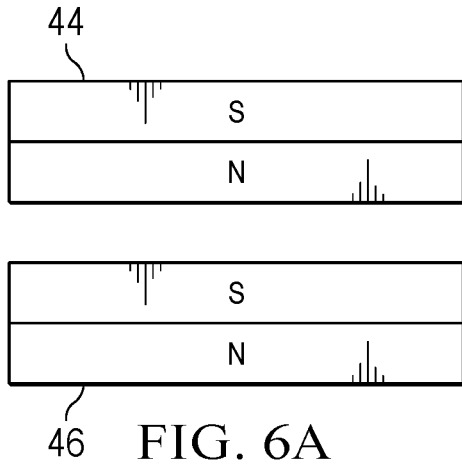
46    FIG. 6A
44
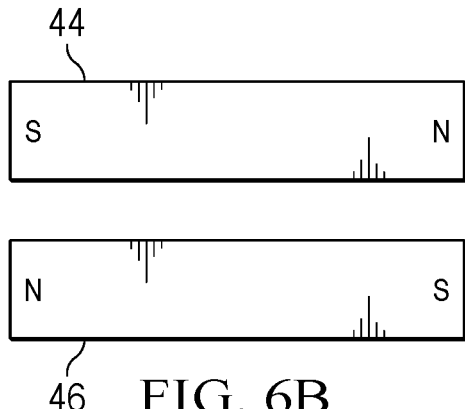
46    FIG. 6B

CIRCULAR DONGLE WINDING MECHANISM WITH ENHANCED RETAINING FEATURES

BACKGROUND OF THE INVENTION

Field of the Invention

The present invention relates in general to the field of information handling system peripheral couplers, and more particularly to an information handling system circular dongle winding mechanism with enhanced retaining features.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems often interact with external peripherals and network communications resources through cabled interfaces, such as data and video ports. Generally, information handling systems include Universal Serial Bus (USB) Type A and/or Type C ports to connect with peripherals, such as a mouse and keyboard. In some instances, information handling systems will include network communication ports, such as an Ethernet RJ45 port. In addition, information handling systems often include one or more display peripheral ports for communication of video information to a display. For example, information handling systems communicate video information to a peripheral display through a variety of display cables and protocols, such as Video Graphics Array (VGA) cable, a DisplayPort cable and a High Definition Multimedia Interface cable. Generally, in order to interface an information handling system with a display, both the information handling system and display have to have the same cable connection ports. If only dissimilar video ports are available, such as a VGA port on a display and an HDMI port on an information handling system, converter "dongles" can sometimes be used to interface the information handling system and display. Such dongles include processing resources within the cable that convert video information in a protocol provided from the information handling system to a protocol accepted by the display.

End users tend to prefer portable information handling systems that have a minimal footprint and weight because such systems provide improved convenience on the go. Smaller housing sizes have reduced the amount of room available for including communications and video ports in an information handling system. For example, RJ45 Ethernet ports and VGA video ports each have a height that makes their inclusion in a low profile information handling system housing prohibitive. In some instances, low profile information handling systems will only include a single USB port that is used for both power and data communications. In such instances, communication of video from an information handling system to an external display typically relies upon wireless protocols or a dongle that translates video information from USB to a compatible video format. An end user generally must have a dongle that performs a protocol conversion for each type of video protocol the end user must perform.

To improve end user convenience, some mobile adapters include multiple protocol conversion capabilities in one housing. For example, the Dell DA100 and DA200, the Bourge Arc Hub, and the Targus USB multi-display adapter all provide multiple video protocol outputs with multiple ports disposed in portable adapter housing. Such mobile adapters typically include a cable with a USB plug that couples to an information handling system, such as USB Type C plug that handles both video and communications data. One difficulty that arises with such mobile adapters is that the cable often hangs freely from the mobile adapter in an awkward manner that makes storage of the mobile adapter difficult. Another difficulty that arises with such mobile adapters is that the multiple ports tend to have a relatively large footprint along the housing length that increases the size of the mobile adapter. Each data and video port can potentially carry a large stream of information, especially where video is provided in high definition and data includes broadband network communications. As a result, compressed footprints that involve multiple video and data communications paths tend to have difficulty maintaining desired data rates due to crosstalk and other electromagnetic interference issues.

To address these difficulties, Dell introduced the DA300 dongle as described in U.S. Pat. No. 10,483,681, which is incorporated herein as though fully set forth. The DA300 dongle provides a rotating mechanism that stores the USB cable when not in use for greater user convenience. When the USB cable rotates for storage in the dongle, a reduced footprint is provided with good cable management for ready portability. Although the DA300 has a compact footprint, some housing thickness is needed to provide sufficient room to hold the cable ports held by the housing. To further improve the dongle and reduce the profile of the dongle, Dell introduced the DA305 and DA310 as described in U.S. Pat. No. 11,316,312, which is incorporated herein as though fully set forth. The reduce housing thickness provided a more compact and user-friendly profile, however the main cable has only a single wind around the spindle, resulting in a cable some users find too short. A longer main cable in a low profile circular dongle housing tends to use more than one wind to fully store the main cable.

SUMMARY OF THE INVENTION

Therefore, a need has arisen for a system and method which fully retracts a cable connector into a mobile peripheral adapter circular housing having more than one wound of the cable within the circular housing when fully retracted.

In accordance with the present invention, a system and method are provided which substantially reduce the disadvantages and problems associated with previous methods and systems for retracting a cable and connector into a circular housing. The circular housing retracts the cable with greater than one wind and biases the cable connector into the circular housing with a first magnet in the upper circular housing portion and a second magnet in the connector upper surface.

More specifically, an information handling system processes information with a processor and memory and interfaces with plural peripheral devices through a mobile peripheral adapter having a cable that retracts and extends and terminates with a connector to couple to an information handling system port. The cable at a central reel within a circular housing interfaces with logical components and ports in an upper circular housing portion that support interactions with peripheral devices. A lower circular housing portion couples to the upper circular housing portion and rotates to retract and extend the cable around the central reel. A cable cavity defined between the circular housing portions fully retracts the cable connector so that none of the connector extends past the perimeter of the circular housing. A first magnet exposed at a bottom surface of the upper circular housing portion magnetically attracts a second magnet included in an upper surface of the cable connector with a slight offset relative to the circular housing to bias the cable connector inward.

The present invention provides a number of important technical advantages. One example of an important technical advantage is that a cable connector fully retracts into a circular housing having greater than one wound of cable around a central reel by positioning magnets of opposing polarity in a bottom surface of an upper circular housing portion and in the connector. When the cable connector fully retracts into the circular housing cable cavity, the upper circular housing portion magnet is located slightly interior relative to the cable connector magnet so that the bias working on the cable connector keeps the full connector within the cable cavity to protect against damage and limit interference with external objects.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIGS. 6A and 6B depict vertical and horizontal configurations of housing magnet and connector magnet magnetic pole alignment;

4

Figure 7A:
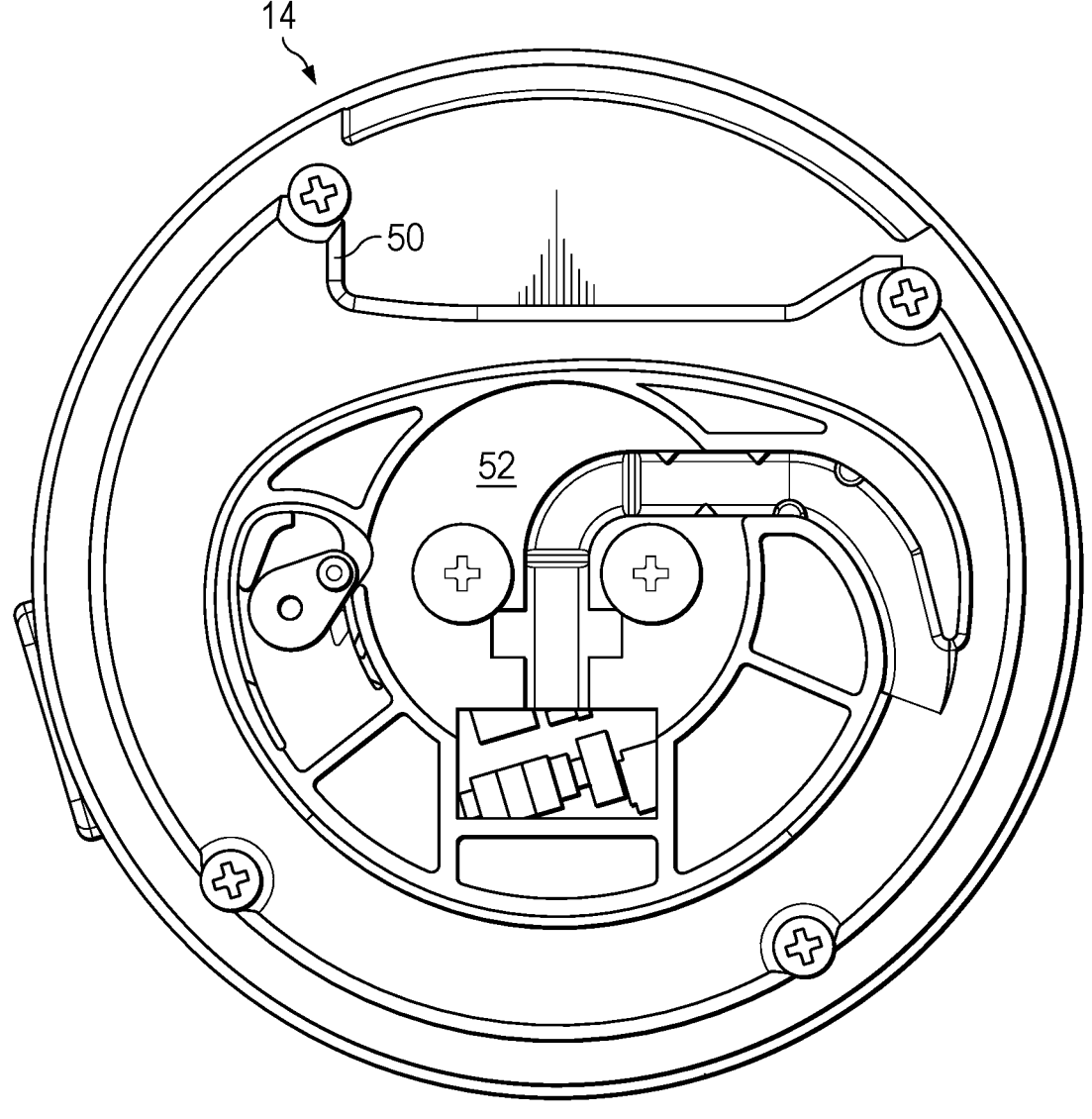
Figure 7B:
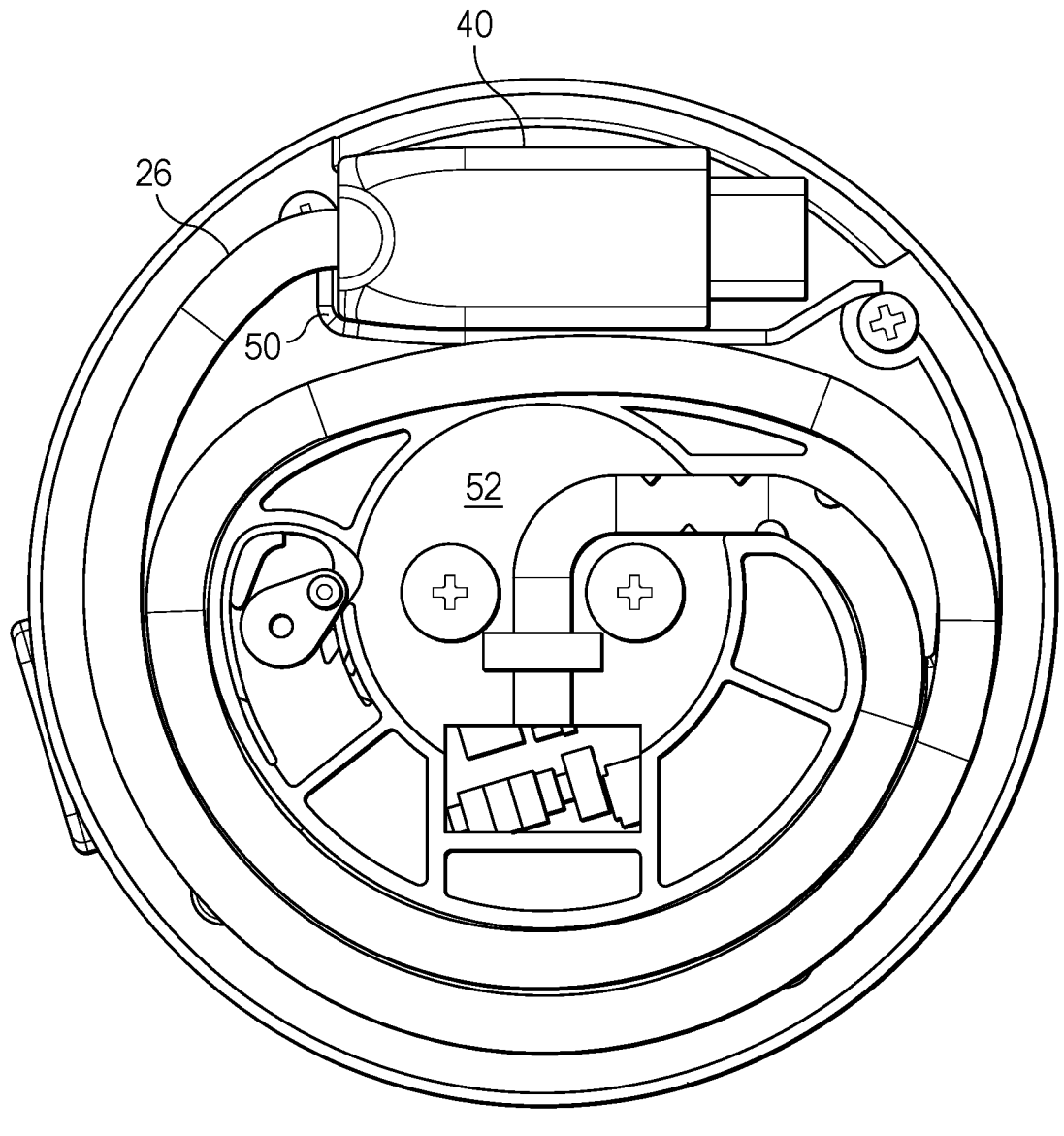
Figure 8:
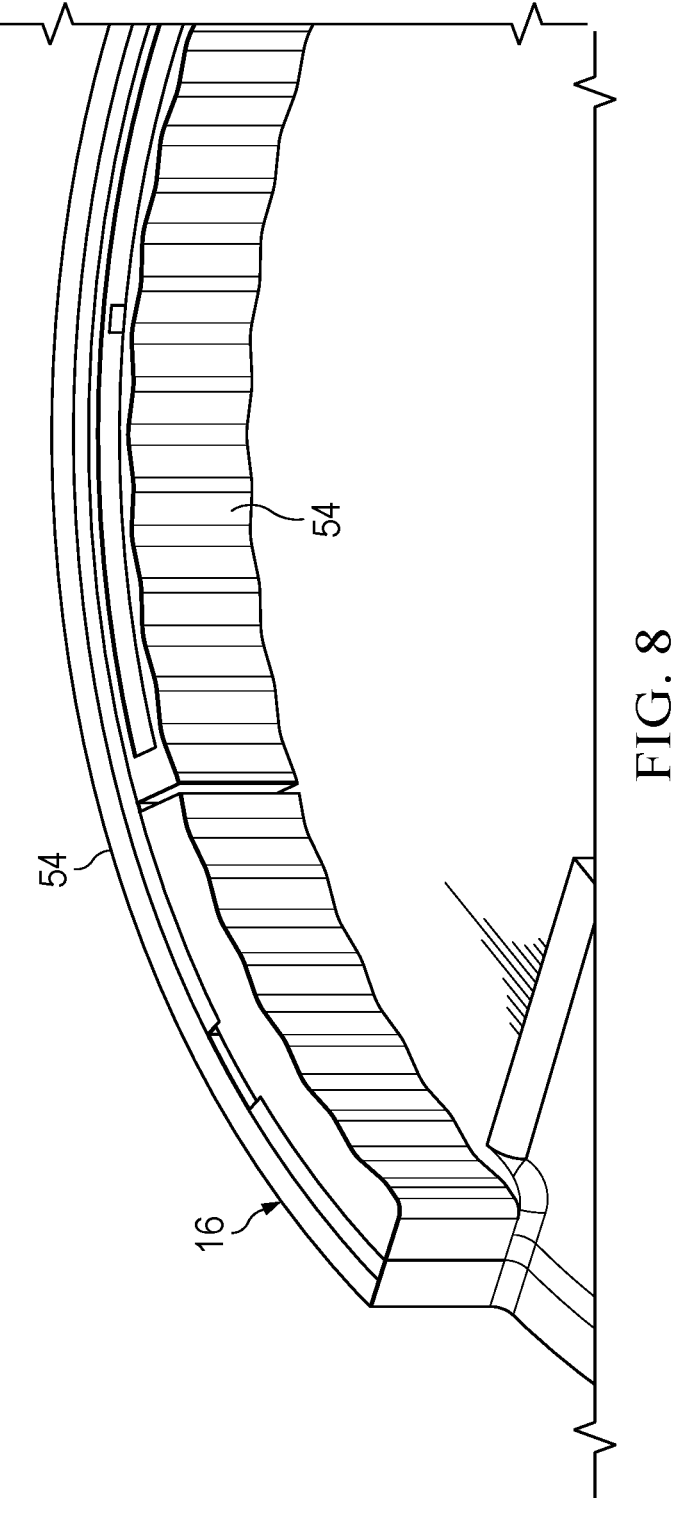
Figure 9A:
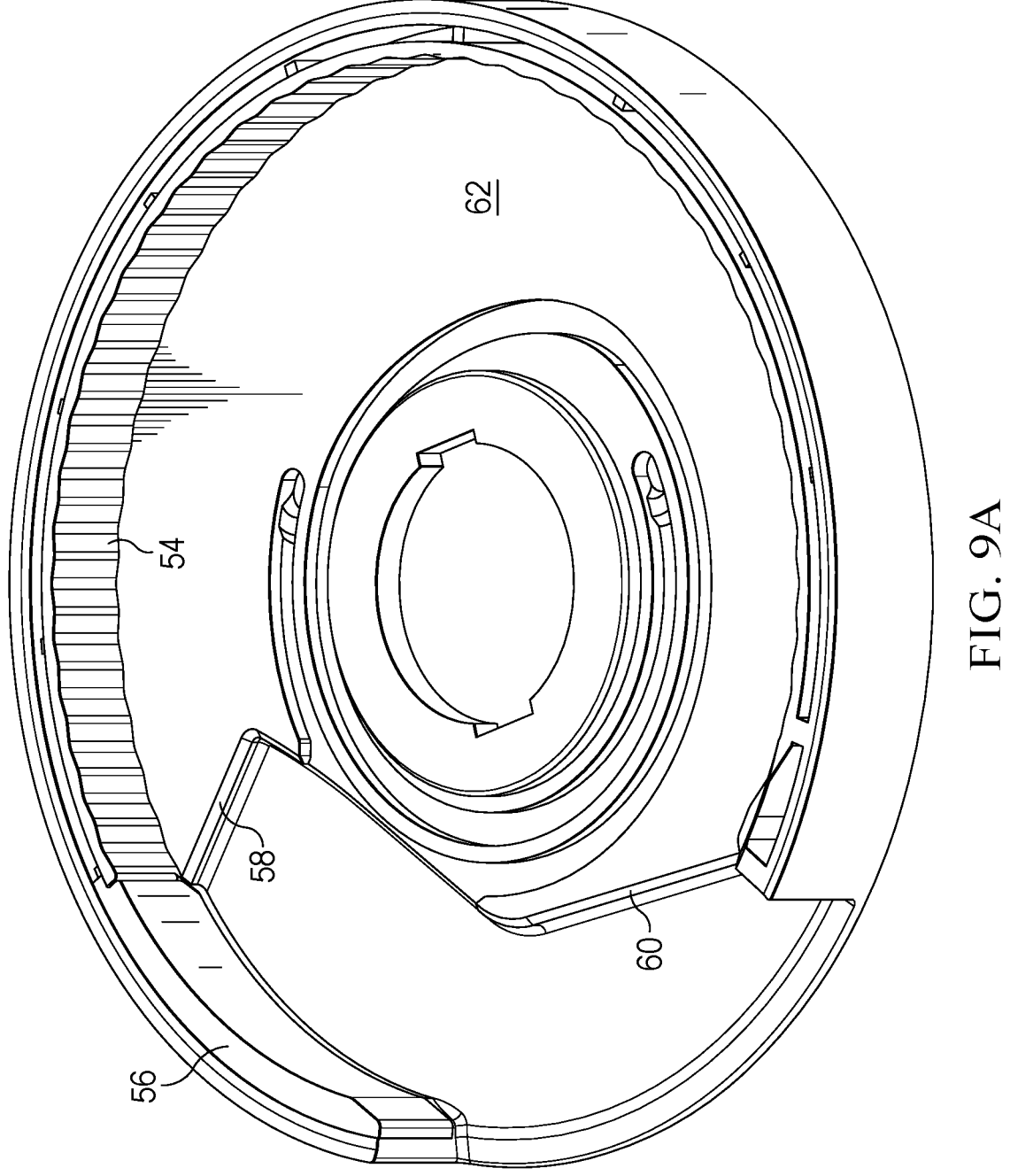
Figure 9B:
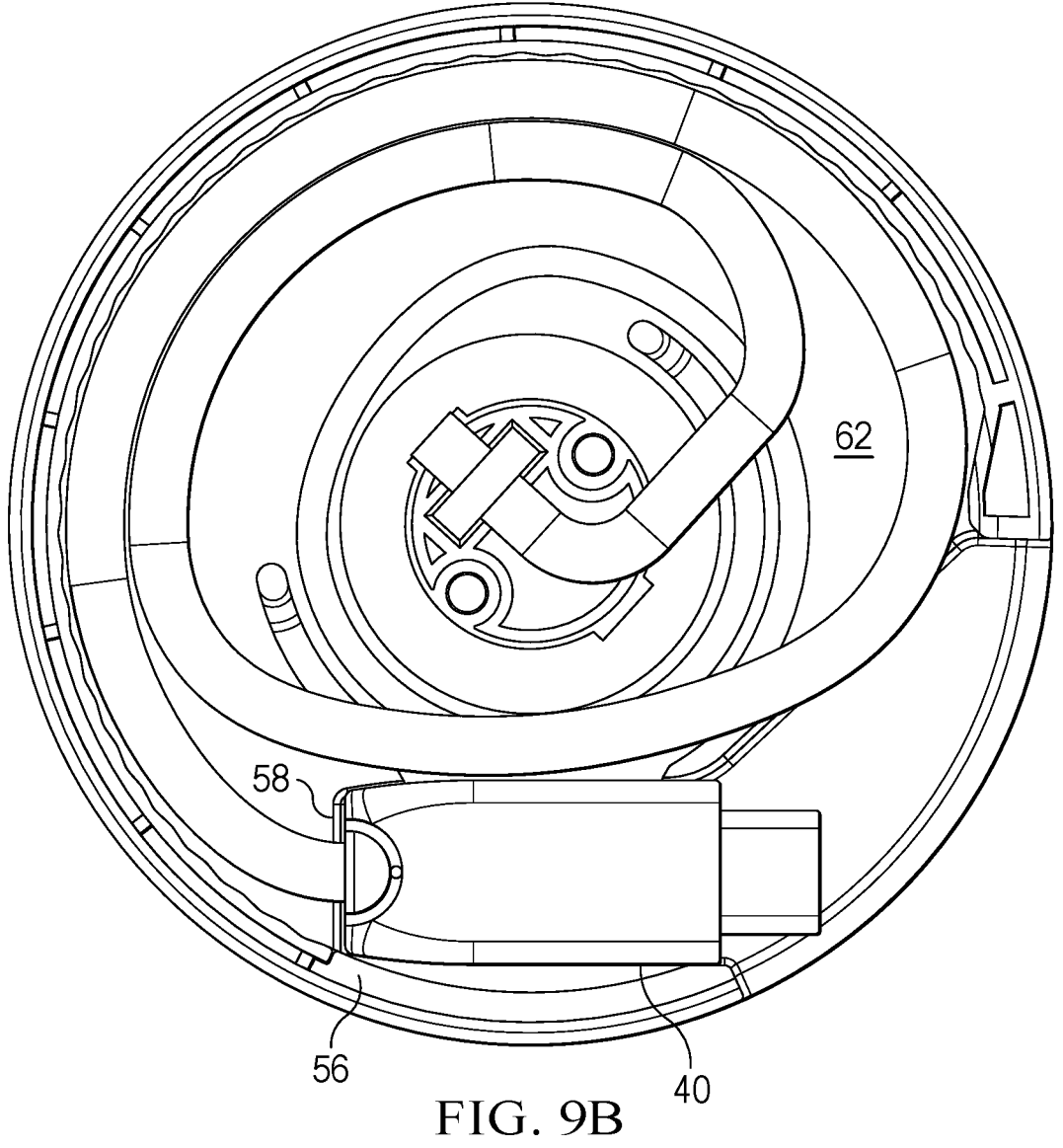
Figure 10A:
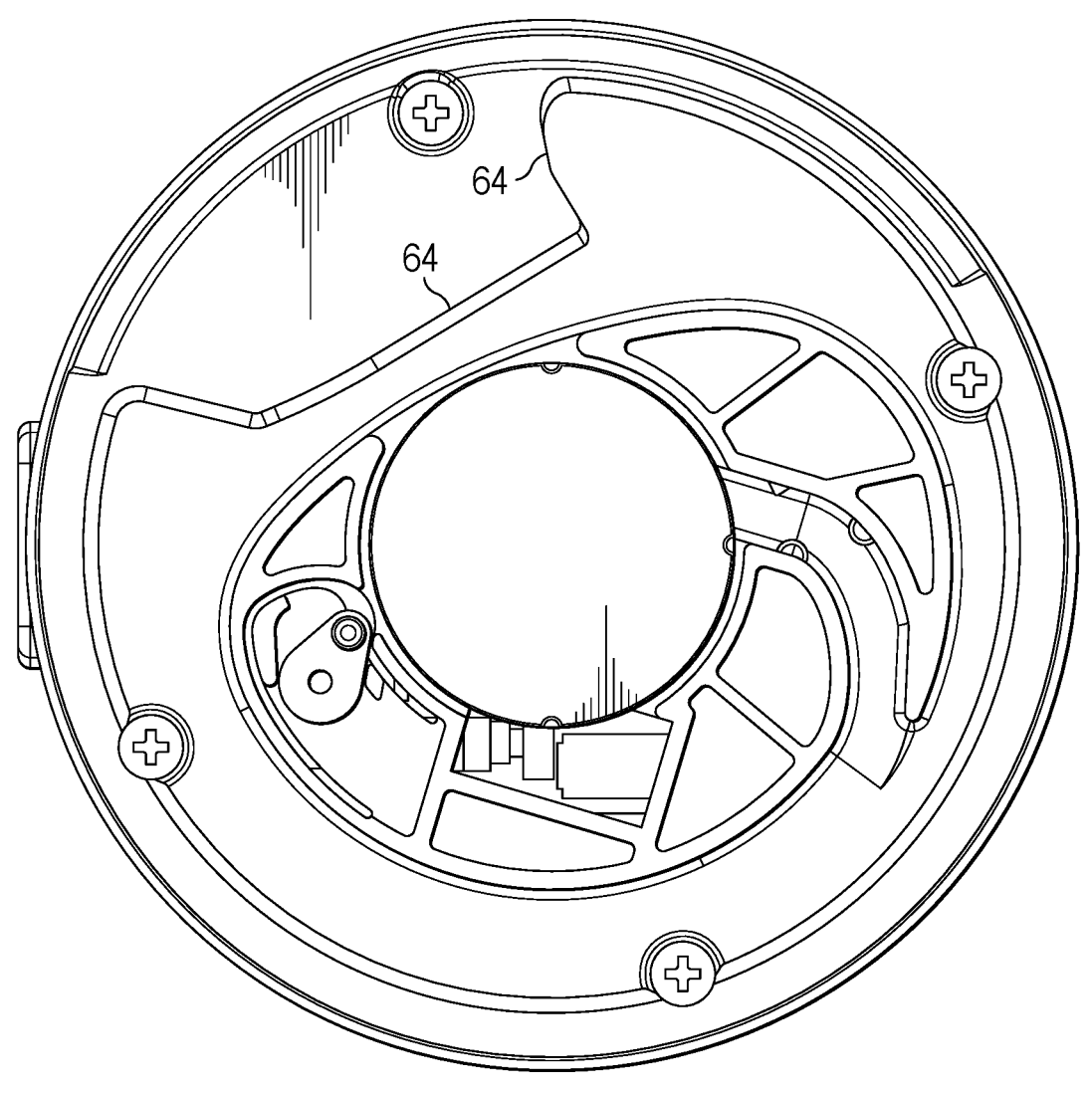
Figure 10B:
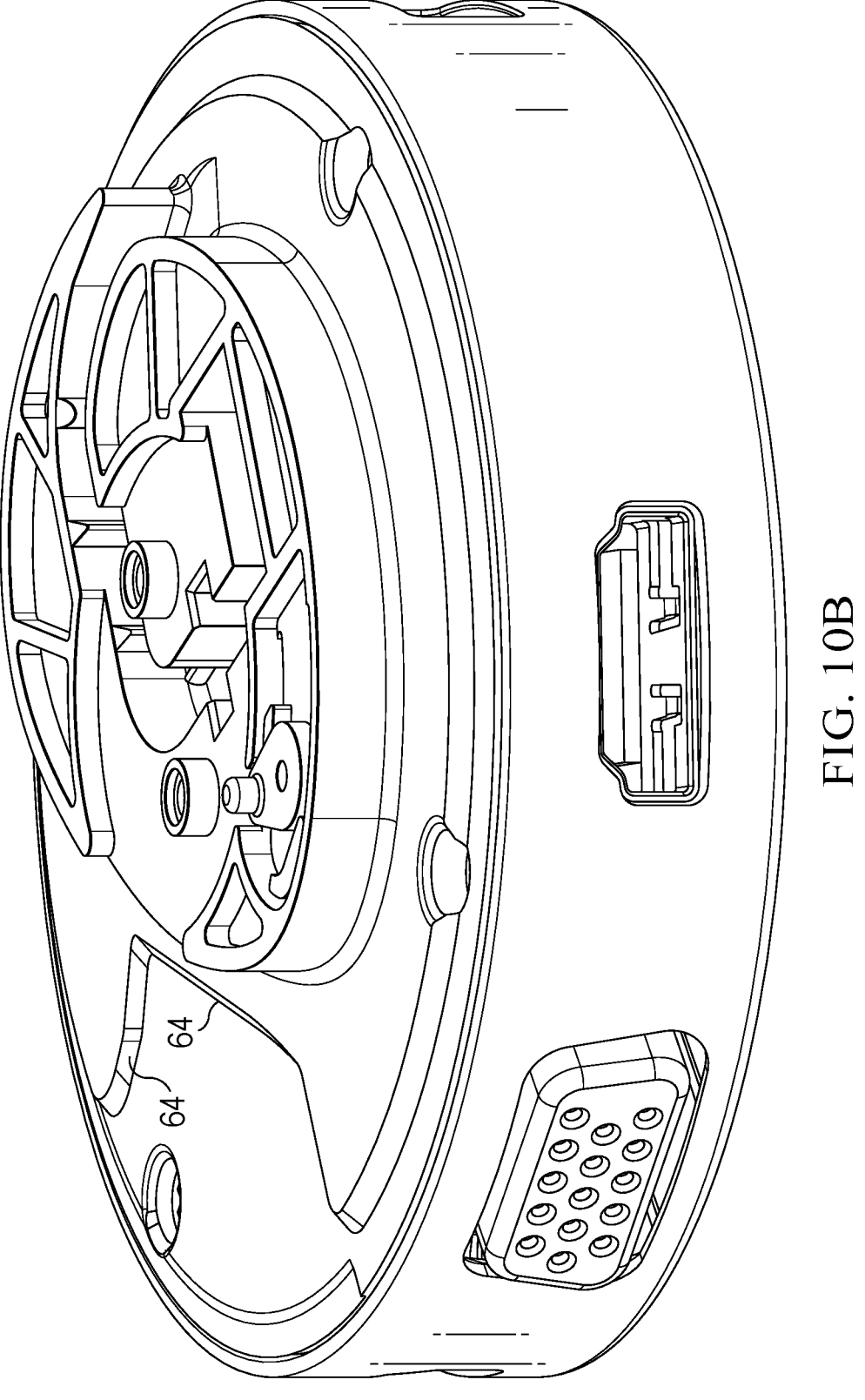
Figure 10C:
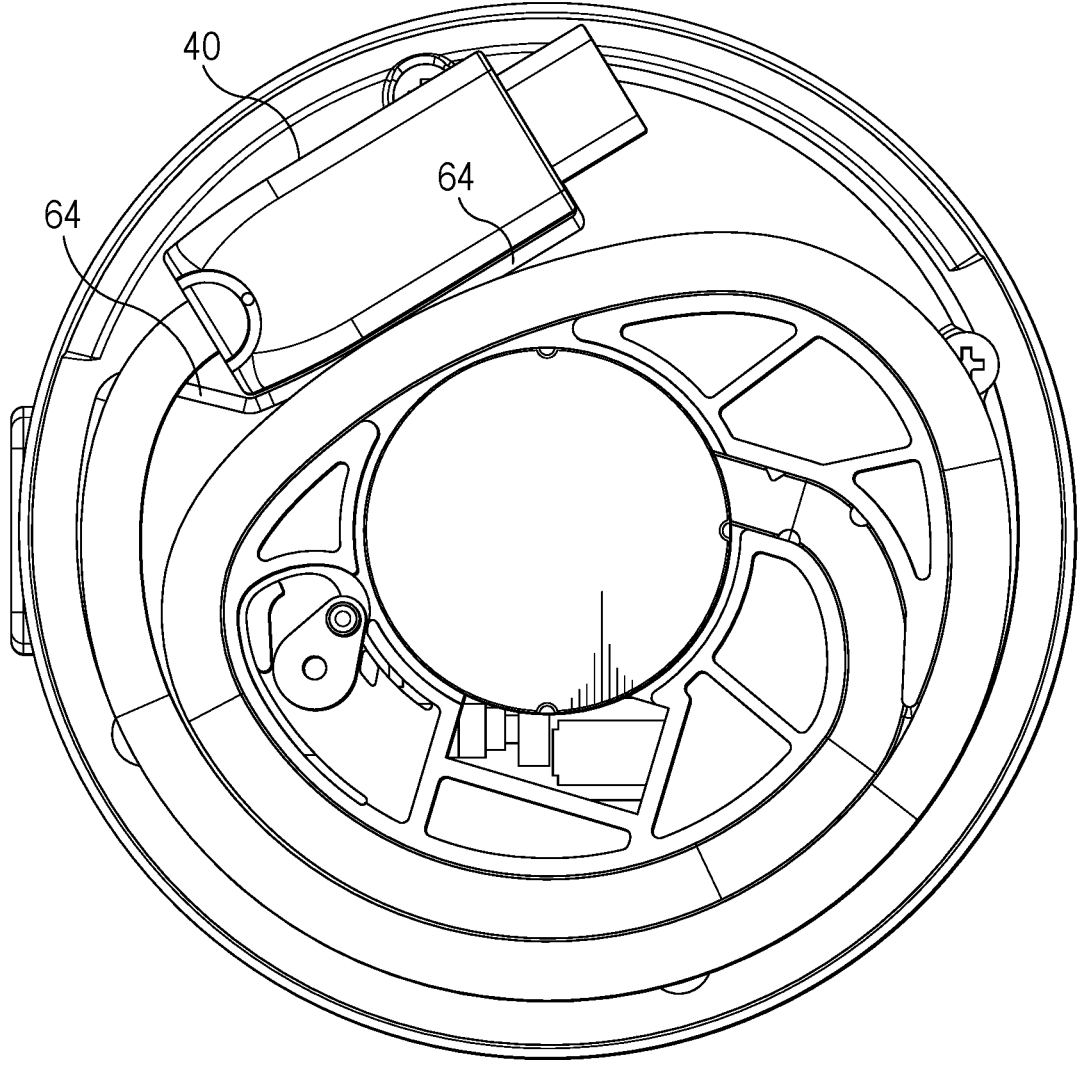

FIGS. 7A and 7B depict the upper circular housing portion without the cable and with the cable having greater than one wound in the retracted position;

FIG. 8 depicts a grooved side surface to aid in cable retraction and extension;

FIGS. 9A and 9B depict an alternative embodiment of the mobile peripheral adapter having a bottom housing portion configured to retain a cable connector; and FIGS. 10A, 10B and 10C depict an alternative embodiment of the mobile peripheral adapter having an upper housing portion configured to retain a cable connector.

DETAILED DESCRIPTION

A mobile peripheral adapter interfaces an information handling system with plural peripherals through a cable having length with greater than one wound around a circular housing. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
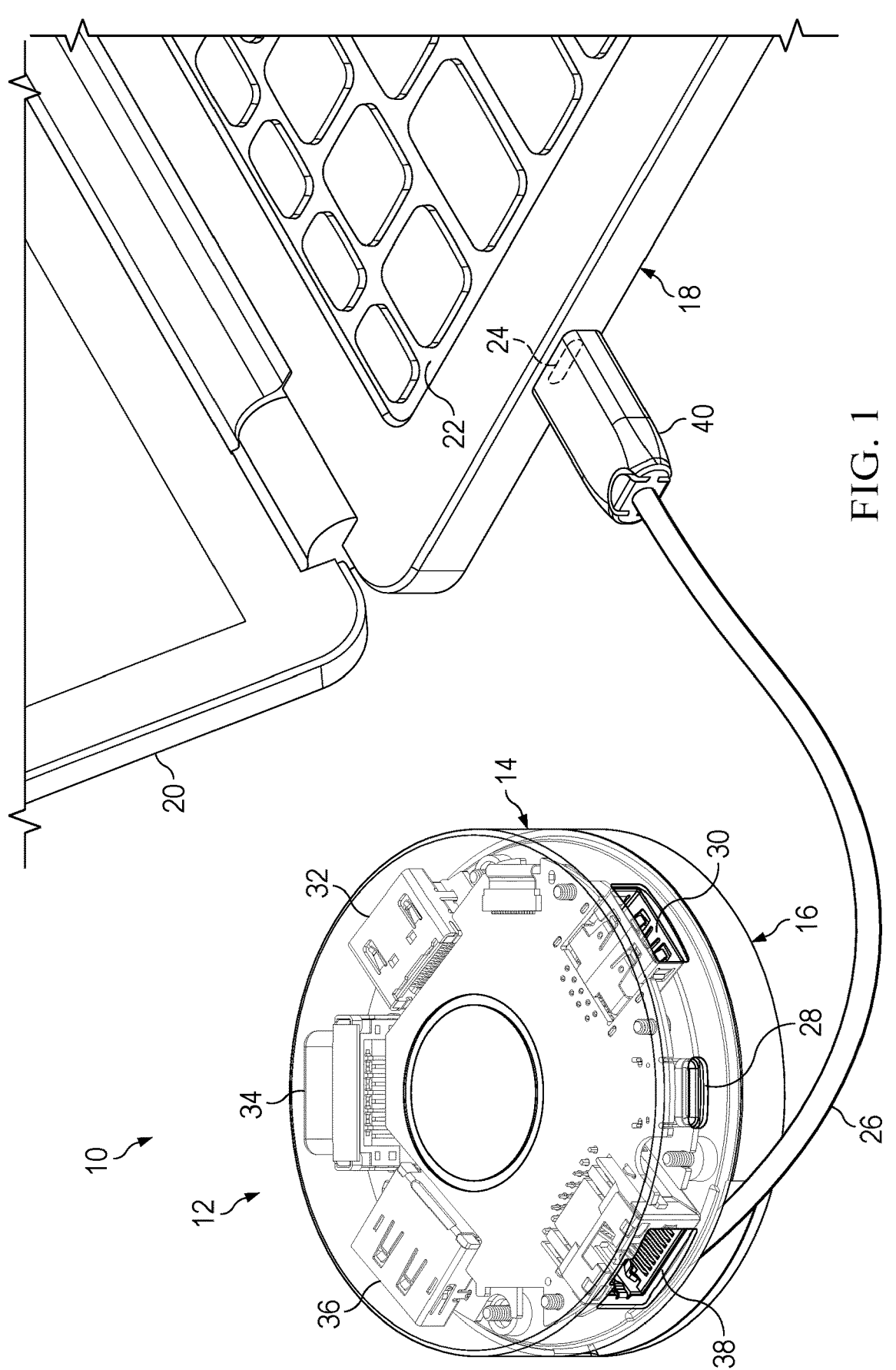
FIG. 1 depicts an upper perspective transparent view of a mobile peripheral adapter with a circular housing having an upper electronics portion rotationally coupled to a lower cable portion.

Referring now to FIG. 1, an upper perspective transparent view depicts a mobile peripheral adapter 10 with a circular housing 12 having an upper electronics circular housing portion 14 rotationally coupled to a lower cable circular housing portion 16. In the example embodiment, mobile peripheral adapter 10 interfaces with a portable information handling system 18 to support information handling system functionality, such as communication with input/output (I/O) devices, other peripherals and network cables. For instance, information handling system 18 integrates processing components, such as a CPU and memory, which cooperate to execute instructions to accept end user inputs at a keyboard 22 and present end user output at a display 20. Information handling system 18 interfaces with mobile peripheral adapter 10 through a cable 26 that couples to a port 24, such as a USB Type C port and cable. Once information handling system 18 communicatively couples to mobile peripheral adapter 10, a plurality of functional ports of mobile peripheral adapter 10 become available as communication pathways to peripheral devices and/or network interfaces. In the example embodiment, mobile peripheral adapter 10 includes a USB Type C port 28, a USB Type A port 30, an HDMI port 32, a VGA port 34, a DisplayPort port 36 and an RJ45 port 38. Processing components disposed in the upper electronics portion 14 translate communications between protocols of each port and the USB Type C protocol of portable information handling system 18. For instance, information handling system 18 may send pixel values that define display images through cable 26 to processing components of upper electronics circular housing portion 14 that, in turn, send the pixel values out a selected of HDMI port 32, VGA port 34 or DisplayPort port 36. As another example, information handling system 18 supports peripheral device and/or network communication through cable 26 with RJ45 port 38, USB Type C port 28 and/or USB type A port 30. Essentially, the processing components in upper electronics portion 14 combine multiple protocol conversion "dongles" into one housing 12 so that a single USB Type C port supports multiple protocols. Similar systems that combines dongles into one housing is the DA200 and DA300 sold by Dell Inc.

Mobile peripheral adapter 10 provides cable management of cable 26 by rotational movement of lower cable portion 16 relative to upper electronics portion 14. In the example depicted by FIG. 1, cable 26 has extended outwards from housing 12 by rotation of the lower cable circular housing portion 16 clockwise relative to electronic circular housing portion 14. To retract cable 26 into lower cable circular housing portion 16, lower cable portion 16 rotates counterclockwise relative to electronic circular housing portion 14. Cable 26 has a length and product size that optimizes cable operation so that sufficient length exists in the extended configuration to allow mobile peripheral adapter 10 to rest out of the way of information handling system 10 when cable 26 inserts into port 24. Cable 26 has a length short enough so that rotation of the housing portions to retract cable 26 provides a complete retraction that does not expose cable 26 outside of housing 12. For example, in one embodiment, a guide integrated between electronic circular housing portion 14 and cable circular housing portion 16 engages cable 26 during rotation so that cable 26 is fully retracted within housing 12 based upon approximately 360 degrees of rotation of the housing portions relative to each other. Rotation to both extend and retract cable 26 provides an intuitive system that is simple for end users to understand. Complete encapsulation of cable 26 within housing 12 in the retracted configuration enhances product robustness and reliability. As is set forth in greater detail below, cable management between the retracted and extended positions is provided with a guide integrated in the housing that enhances robustness because standalone parts, coil springs and other separate mechanical parts are not needed.

In the example embodiment, cable 26 extends from a cable cavity defined in the lower housing portion and out an opening formed in the side of the lower housing portion. Cable 26 has a length that provides increased distance to information handling system 10 to aid end user interactions. The increased length has greater than one wound, that is more the 360 degrees of revolution, within circular housing 12. As is described in greater depth below, magnets disposed in the cable cavity provide an upward bias on cable connector 40 to hold it in the stored position within the opening and above the support surface on which mobile peripheral adapter 10 rests. The magnets are positioned to adapt the magnetic attraction for use when two or more cable thicknesses are wound around the inner perimeter of circular housing 12. A slight displacement of the magnets provides an inward bias of the cable connector 40 so that none of the cable connector is exposed at the exterior of circular housing 12 when the cable fully retracts.

Figure 2:
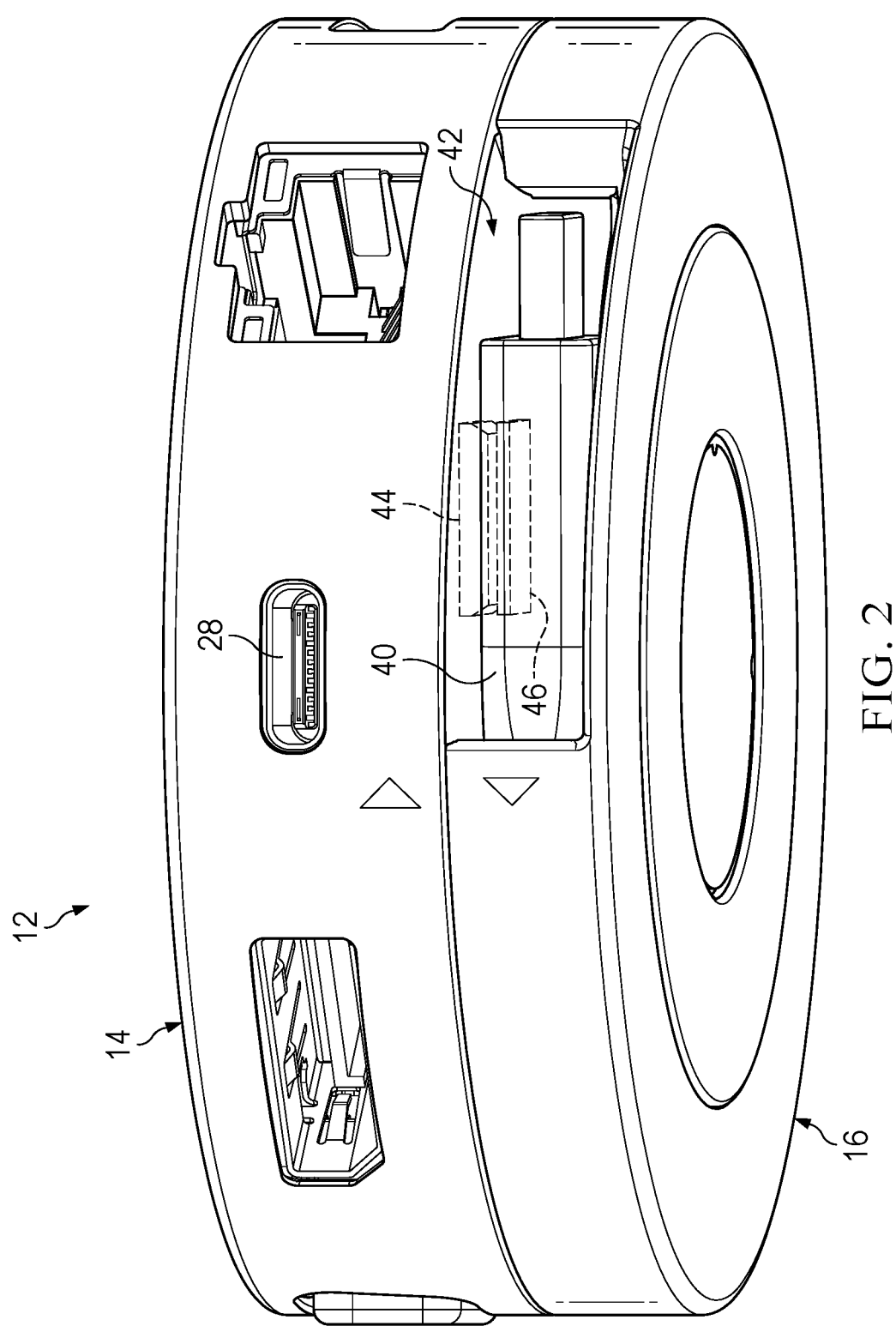
FIGS. 2 and 2A depict a side view of the mobile peripheral adapter having a cable and connector fully retracted into a cable cavity.
Figure 2A:
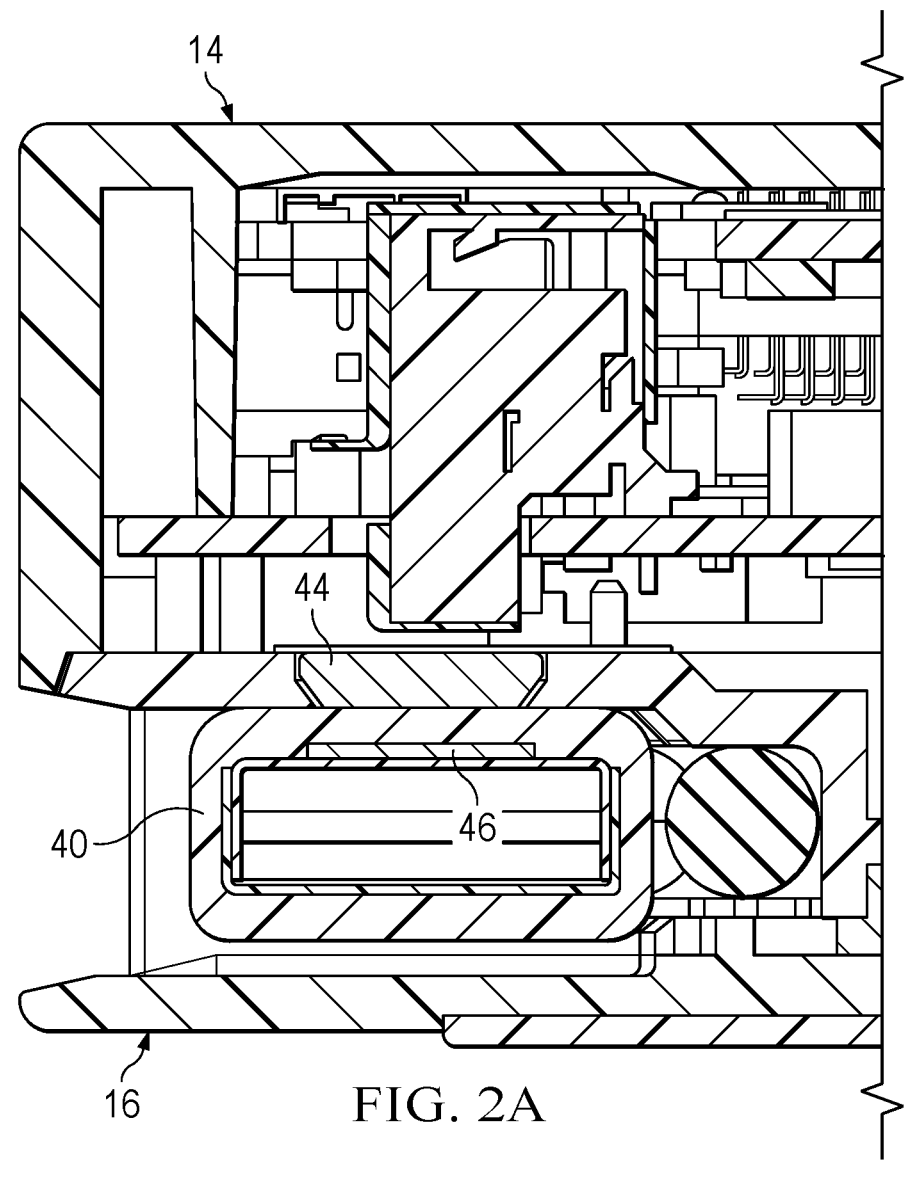

Referring now to FIGS. 2 and 2A, a side view of the mobile peripheral adapter 10 depicts cable 26 and connector 40 fully retracted into a cable cavity 42. Retraction of cable connector 40 is performed initially by rotation of circular housing portions 14 and 16 to wind the cable around the center of the interior of circular housing 12 until connector 40 enters cable cavity 42, which is defined between the circular housing portions 14 and 16. Once connector 40 enters cable cavity 42, an upper magnet 44 integrated in the upper circular housing portion 14 attracts to a connector magnet 46 included in an over mold of connector 40, which fully retracts connector 40 within circular housing 12. FIG. 2 depicts a sectional view of circular housing portions 14 and 16 rotationally coupled and having magnets 44 and 46 aligned when connector 40 fully retracts into circular housing 12. In the example embodiment, upper magnet 44 is displaced by one millimeter or more towards the interior of circular housing 12 relative to connector magnet 46 to maintain an inward bias on connector 40 that encourages full retraction of connector 40 into circular housing 12.

Figure 3:
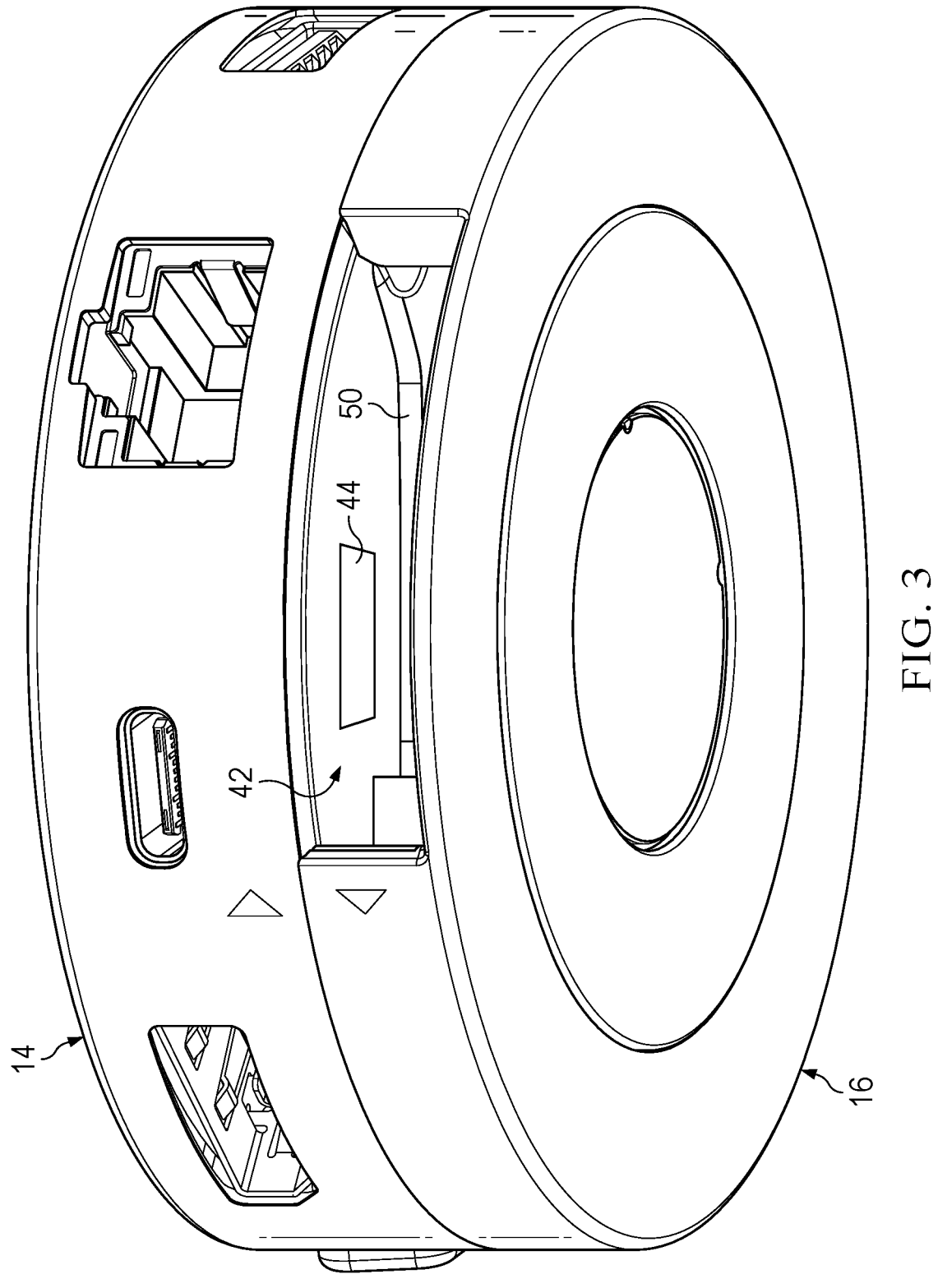
FIG. 3 depicts a bottom perspective view of the mobile peripheral adapter with the connector removed from the cable cavity.

Referring now to FIG. 3, a bottom perspective view depicts the mobile peripheral adapter 10 with the connector removed from the cable cavity 42. At the bottom surface of upper circular housing portion 14, magnet 44 is exposed to have a minimum distance between magnet 44 and the connector when the connector is retracted. Magnet 44 is displaced slightly interior to a vertical alignment with the connector so that magnetic attraction biases the connector inward and against a cavity wall 50 that defines the interior of the cavity available to the connector.

Figure 4:
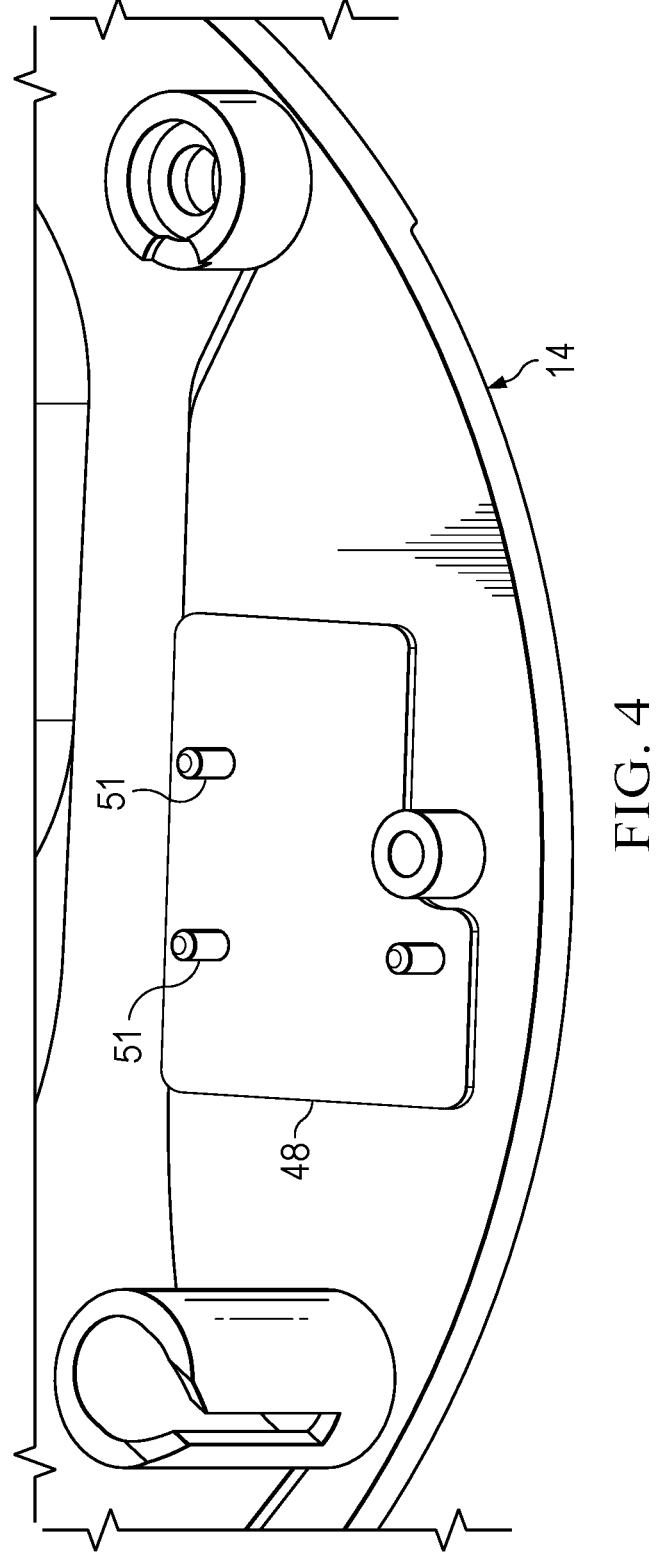
FIGS. 4, 4A and 4B depict the mobile peripheral adapter upper magnet and coupling arrangement.
Figure 4A:
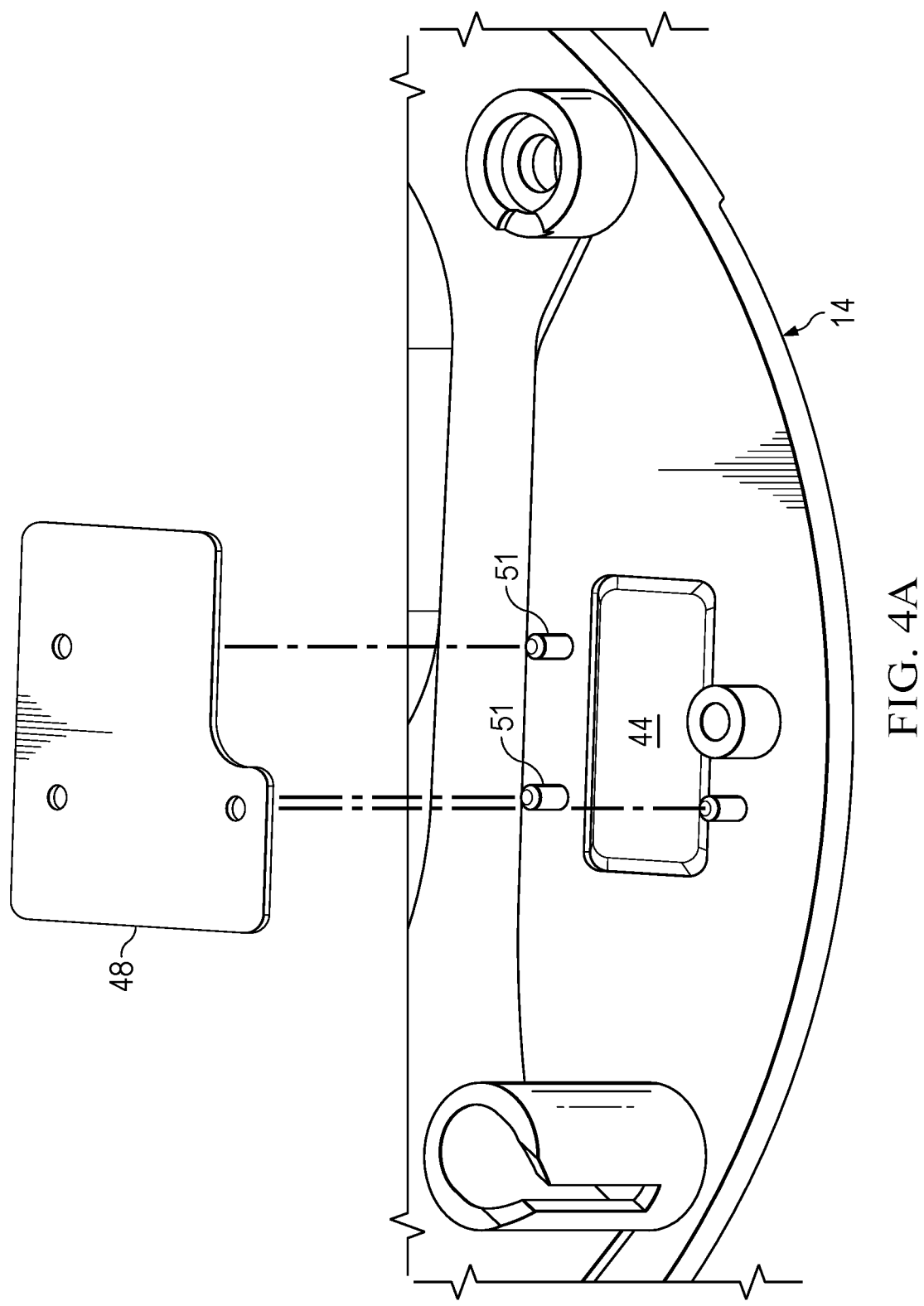
Figure 4B:
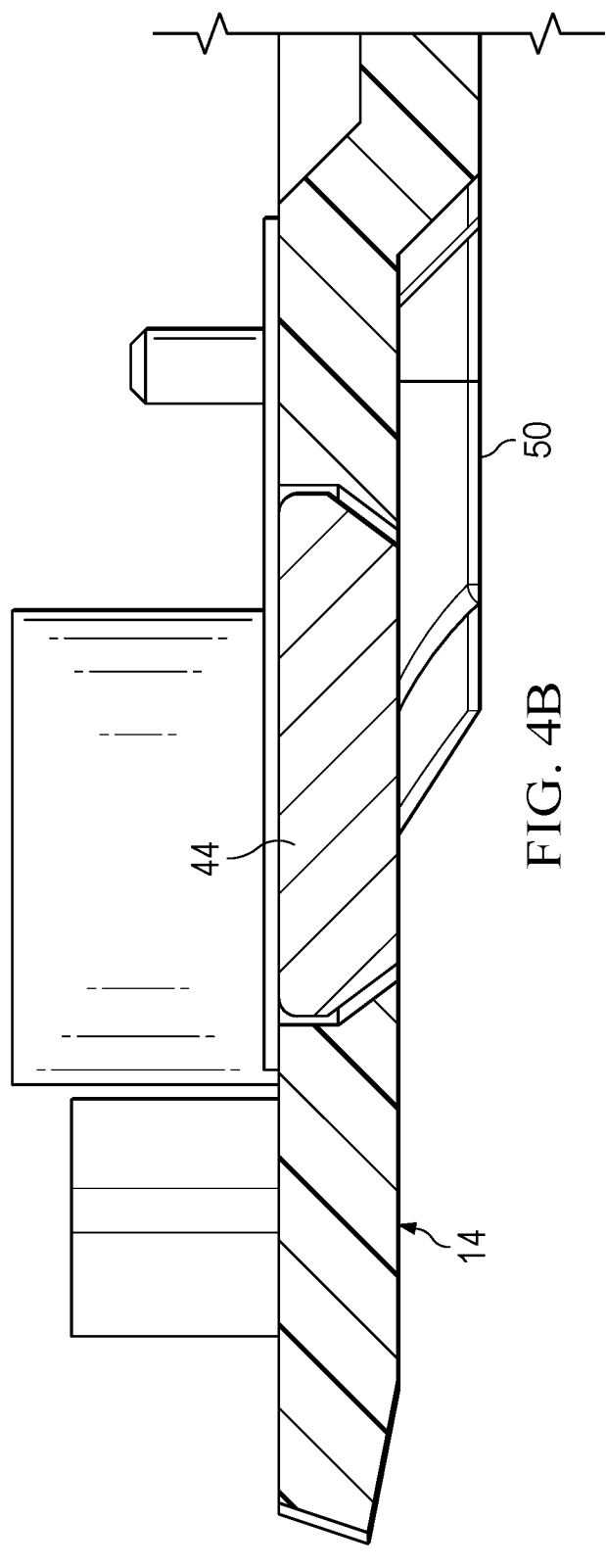

Referring now to FIGS. 4, 4A and 4B, the mobile peripheral adapter upper magnet 44 and coupling arrangement are depicted. FIG. 4 depicts the bottom of upper circular housing portion 14 having a ferromagnetic plate 48 coupled with heat stakes 51 over the position of upper magnet 44. FIG. 4A depicts the ferromagnetic plate 48 exploded up from the bottom side of circular housing portion 14 to expose the top side of magnet 44. FIG. 4B depicts a sectional view of magnet 44 engaged in the bottom side of circular housing portion 14 to have the lower surface of magnet 44 exposed to the cable cavity. The opening formed in circular housing portion 14 has beveled edges that mate to beveled side surfaces of magnet 44 so that magnet 44 will not fall through the opening while ferromagnetic plate 48 offers further support and prevents removal above.

Figure 5:
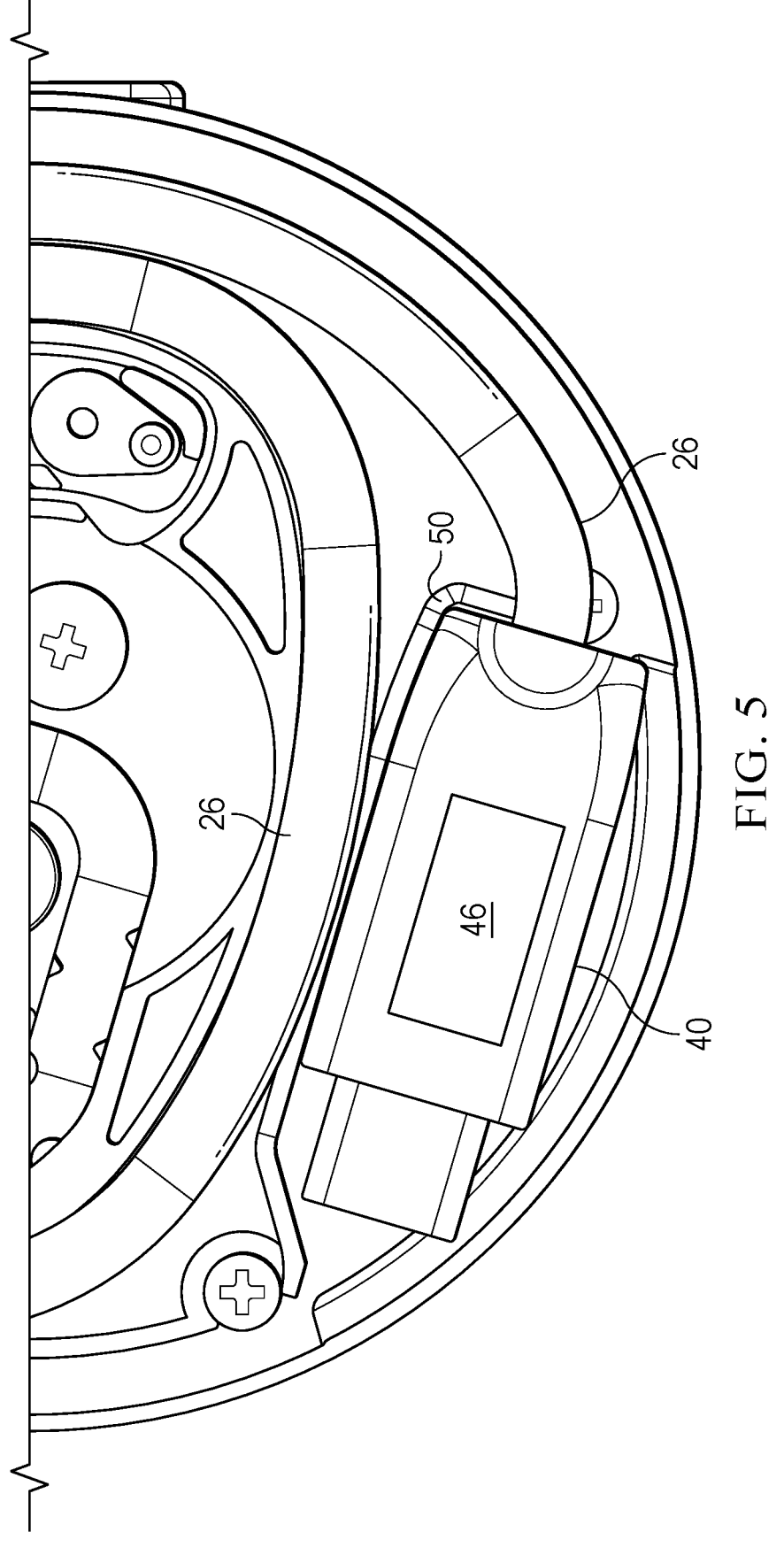
FIG. 5 depicts a bottom view of the upper circular housing portion and position of the connector when fully retracted.

Referring now to FIG. 5, a bottom view depicts the upper circular housing portion 14 and the position of connector 40 when fully retracted. Cable 26 has greater than a full wound around the center of the circular housing with at least a cable thickness separating connector 40 from the interior center. Cavity wall 50 restricts connector 40 from further inward movement once the end of connector 40 is fully retracted. Cavity wall 50 conforms to the shape of connector 40 to hold connector 40 in place with magnet 46 working to bias connector 40 further into the interior. The interior side of cavity wall 50 can include a curved shape that helps to guide the cable without pushing out the connector.

Referring now to FIGS. 6A and 6B, vertical and horizontal configurations are depicted housing magnet and connector magnet magnetic pole alignment. FIG. 6A depicts a vertical polar orientation so that a north pole of the upper magnet 44 attracts a south pole of the magnet 46. FIG. 6B depicts a horizontal polar orientation so that north and south poles of upper magnet 44 place opposite north and sound poles of lower magnet 46. In one embodiment, the horizontal polar orientation offers an advantage of pushing the connector out of the cable cavity as rotation of the circular housing puts like poles in alignment to generate a repelling force.

Referring now to FIGS. 7A and 7B, the upper circular housing portion 14 is depicted without the cable and with the cable having greater than one wound in the retracted position. FIG. 7A depicts the cavity wall 50, which separates the cavity from a central reel 52 and defines a channel through which the cable winds to achieve greater than one wound around reel 52. Cavity wall 50 on the inner side facing reel 52 can include a curve that helps to guide the cable and limits push out of the cable towards the connector. FIG. 7B depicts cable 26 wound greater than one wind of more than 360 degrees. In the retracted position, a portion of the cable is disposed between the reel 52 and connector 40. The extra wind of cable supports a longer cable use case so that the mobile peripheral adapter can rest further away from the information handling system that the cable interfaces with.

Referring now to FIG. 8, a grooved side surface 54 is depicted to aid in cable retraction and extension. The grooves or wavy surface helps to reduce friction between the cable and the lower circular housing portion 16 during cable winding for extension and retraction.

Referring now to FIGS. 9A and 9B, an alternative embodiment of the mobile peripheral adapter is depicted having a bottom housing portion configured to retain a cable connector. In the example embodiment, an insertion surface 56 integrated with the bottom circular housing portion helps to guide the cable connector end into a garage area defined by an end wall 58 and side wall 60. The bottom circular housing portion is molded from a hard plastic, such as ABS, while insertion surface 56 is a nylon or similar material, which has self-lubrication properties that reduce wear and tear from a metal connector end. When the connector completely inserts into the cable cavity, end wall 58 limits connector insertion so that the connector is blocked by insertion surface 56 from having the metal tip extend outside of the mobile peripheral adapter circular housing. Side wall 60 defines the placement of the cable and connector inner side. A ramped portion 62 extends down from side wall 60 to the bottom surface of the bottom housing portion to bias the cable when wound inward and away from the connector. The arrangement of the insertion surface, end wall and side wall cooperate to maintain a fully retracted cable and connector fully within the circular housing without a need for magnetic attraction, although including small magnets can aid in the retraction process. FIG. 9B depicts connector 40 fully inserted into the cable cavity with the tip held by insertion surface 56 to maintain a position within the cable cavity.

Referring now to FIGS. 10A, 10B and 10C, an alternative embodiment of the mobile peripheral adapter is depicted having an upper housing portion configured to retain a cable connector. A raised wall feature 64 contacts against connector 40 at the front portion of the connector over mold when the connector reaches a home position. In particular, the connector is limited in movement by the raised wall feature so that twisting and/or rotational forces will not work the connector out of the cable cavity. Outward rotation of the USB plug can happen as the cable and connector attempt to return to a position that is in line with the cable axis. The wrapping of the cable within the circular profile can induce an unnatural curved state so that the stiffness of the cable and strain relief work to return the connector to a position that is in line with the cable. FIG. 10A depicts a bottom view of the upper circular housing portion showing the boundary of raised wall feature 64. FIG. 10B depicts a side perspective view of the bottom surface of the upper circular housing portion showing the beveled side surface of raised wall feature 64. FIG. 10C depicts a bottom view of the upper circular housing portion having connector 40 retained in place by raised wall feature 64, which cooperates with the features of the bottom circular housing portion shown in FIGS. 9A and 9B.

Although the present invention has been described in detail, it should be understood that various changes, substitutions and alterations can be made hereto without departing from the spirit and scope of the invention as defined by the appended claims.

What is claimed is:

1. A mobile peripheral adapter comprising:

a first circular housing portion having plural port openings;

plural ports disposed at the plural port openings, each of the plural ports configured to accept a predetermined cable plug;

a second circular housing portion rotationally coupled to the first circular housing portion to define a cable cavity having an upper surface, a lower surface, an outer perimeter and an inner perimeter;

a cable disposed in the cable cavity and interfaced with the plural ports, the cable winding to a stored position when the first and second circular housing portions rotate in a first direction and unwinding to an extended position when the first and second circular housing portions rotate in a second direction, the cable terminating with a connector;

a first magnet coupled in a bottom surface of the first circular housing portion above the cable cavity, the first magnet having a first polarity alignment, the entirety of the first magnet disposed above the cable cavity; and a second magnet coupled in an upper surface of the cable connector, the first and second magnets interacting to bias the cable connector fully into the cable cavity.

2. The mobile peripheral adapter of claim 1 wherein the first magnet is located further in the cable cavity than the second magnet when the cable connector is fully in the cable cavity.

3. The mobile peripheral adapter of claim 2 wherein the first and second magnets vertically align opposing poles.

4. The mobile peripheral adapter of claim 2 wherein the first and second magnets horizontally align opposing poles.

5. The mobile peripheral adapter of claim 2 further comprising a ferromagnetic plate coupled to the first circular housing above the first magnet.

6. The mobile peripheral adapter of claim 5 wherein the first magnet has beveled edges that fit within a beveled opening of the first circular housing portion.

7. The mobile peripheral adapter of claim 6 wherein the cable stored position has greater than one circular winding around an inner perimeter of the first circular housing.

8. The mobile peripheral adapter of claim 1 further comprising ridges formed in the second circular housing portion interior along the outer perimeter to engage the cable during retraction and extension.

9. The mobile peripheral adapter of claim 8 wherein the cable connector comprises a USB connector having a rubberized over mold of the second magnet.

10. A method for managing a mobile peripheral adapter cable, the method comprising:

capturing the cable between first and second circular housing portions;

rotating the first and second circular housing portions in a first manner to extend the cable;

rotating the first and second circular housing portions in a second manner to retract the cable; and fully retracting a connector at the end of the cable into a cavity between the first and second circular housing portions by interaction of a first magnet disposed at a bottom side of the first housing portion and a second magnet disposed at a top side of the connector, the entirety of the first magnet disposed above the cable cavity above the connector.

11. The method of claim 10 further comprising:

coupling the first magnet a predetermined distance closer to an inner side of the cavity than the second magnet is positioned when the connector fully retracts into the cavity; and exposing the first magnet at the bottom side to directly touch the connector when the connector fully retracts into the cavity.

12. The method of claim 11 further comprising coupling the second magnet to the connector with an over mold at a temperature of less than a melting temperature of the magnet.

13. The method of claim 11 further comprising:

forming a beveled opening in the first circular housing portion;

forming a beveled edge on the first magnet to fit in the beveled opening; and coupling a ferromagnetic plate over the opening to hold the first magnet in place.

14. The method of claim 13 further comprising arranging the first and second magnets to have horizontally configured opposing magnetic poles.

15. The method of claim 13 further comprising arranging the first and second magnets to have vertically configured opposing magnetic poles.

16. The method of claim 13 wherein the cable winds greater than one fully winding within the first and second circular housing portions when the cable connector fully retracts.

17. A mobile peripheral adapter comprising:

first and second circular housing portions rotationally coupled to each other to define a cable cavity;

a cable having a connector coupled to the first housing portion, the cable retracting when the first and second housing portions are rotated in a first manner and extending when the first and second housing portions are rotated in a second manner;

a first magnet coupled in the first housing portion bottom side to align above the cable connector when the cable connector fully retracts into the cavity, no portion of the first magnet below a top surface of the cable connector when the cable connector is in the cavity; and a second magnet coupled in the cable connector upper side aligned to fully retract the cable connector into the cavity by magnetic interaction with the first magnet.

18. The mobile peripheral adapter of claim 17 wherein the first magnet is positioned at least one millimeter closer to a center of the first housing portion than the second magnet when the cable connector fully retracts into the cavity.

19. The mobile peripheral adapter of claim 17 further comprising:

a metal plate coupled to the first circular housing portion above the first magnet;

wherein the first magnet is exposed at the bottom surface of the first circular housing portion.

20. The mobile peripheral adapter of claim 19 wherein the cable has greater than one wound around the first and second circular housing portions when the connector is fully retracted.

* * * * *